(12) United States Patent
Zhu et al.

(10) Patent No.: US 11,190,023 B2
(45) Date of Patent: Nov. 30, 2021

(54) PHOTOVOLTAIC INVERTER SYSTEM AND METHOD FOR CONTROLLING THE SAME

(71) Applicant: Delta Electronics (Shanghai) Co., Ltd., Shanghai (CN)

(72) Inventors: Xuancai Zhu, Shanghai (CN); Bingwen Weng, Shanghai (CN); Qin Wang, Shanghai (CN); Wei Zhao, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 127 days.

(21) Appl. No.: 16/673,976

(22) Filed: Nov. 5, 2019

(65) Prior Publication Data

US 2020/0343730 A1 Oct. 29, 2020

(30) Foreign Application Priority Data

Apr. 23, 2019 (CN) .......................... 201910329041.8

(51) Int. Cl.
*H02J 3/38* (2006.01)
*H02S 40/32* (2014.01)

(52) U.S. Cl.
CPC .............. *H02J 3/385* (2013.01); *H02S 40/32* (2014.12)

(58) Field of Classification Search
CPC ........ H02J 3/385; H02J 2300/26; H02J 3/381; H02S 40/32; H02S 40/30; Y02E 10/56
USPC ..................................................... 307/82–88
See application file for complete search history.

(56) References Cited

U.S. PATENT DOCUMENTS

| 8,289,742 | B2 | 10/2012 | Adest et al. |
| 2008/0147335 | A1 | 6/2008 | Adest et al. |
| 2010/0109442 | A1 | 5/2010 | Vega Betoret et al. |
| 2011/0160930 | A1 | 6/2011 | Batten et al. |
| 2012/0176076 | A1* | 7/2012 | Mansfield ............... H02S 50/10 320/101 |
| 2013/0307556 | A1 | 11/2013 | Ledenev et al. |
| 2013/0320778 | A1 | 12/2013 | Hopf et al. |
| 2014/0175888 | A1 | 6/2014 | Deboy |
| 2014/0191589 | A1 | 7/2014 | Friebe et al. |

(Continued)

FOREIGN PATENT DOCUMENTS

| CN | 102843022 A | 12/2012 |
| CN | 104993687 A | 10/2015 |

(Continued)

*Primary Examiner* — Toan T Vu

(74) *Attorney, Agent, or Firm* — CKC & Partners Co., LLC

(57) ABSTRACT

The invention discloses a photovoltaic inverter system and a method for controlling the same. The photovoltaic inverter system comprises: an optimizing module string and an inverter, wherein the optimizing module string comprises a plurality of optimizing modules each having an input port coupled to at least one photovoltaic module, output ports of the plurality of optimizing modules are connected in series, each of the optimizing modules comprises a control unit, an input port of the inverter is coupled to an output port of the optimizing module string, the inverter comprises an auxiliary detection module for auxiliary detecting an output current of the optimizing module string, and the control unit controls an output voltage of the optimizing module string based on the output current of the optimizing module string, such that the output voltage satisfies a start-up condition of the inverter.

10 Claims, 5 Drawing Sheets

(56) References Cited

U.S. PATENT DOCUMENTS

| | | |
|---|---|---|
| 2014/0373894 A1 | 12/2014 | Stratakos et al. |
| 2015/0137606 A1* | 5/2015 | Adest .................. H02J 1/00 |
| | | 307/77 |
| 2015/0381108 A1* | 12/2015 | Hoft ................. G01R 31/52 |
| | | 136/244 |
| 2016/0172860 A1 | 6/2016 | Lipan et al. |
| 2020/0295572 A1 | 9/2020 | Yao et al. |
| 2021/0033483 A1* | 2/2021 | Ko .................. H01M 10/613 |

FOREIGN PATENT DOCUMENTS

| | | |
|---|---|---|
| CN | 105075046 A | 11/2015 |
| CN | 106253330 A | 12/2016 |
| CN | 106877311 A | 6/2017 |
| CN | 104079001 B | 8/2017 |
| WO | 2017141357 A1 | 8/2017 |

* cited by examiner

PHOTOVOLTAIC INVERTER SYSTEM AND METHOD FOR CONTROLLING THE SAME

CROSS-REFERENCE TO RELATED APPLICATIONS

This non-provisional application claims priority under 35 U.S.C. § 119(a) on Patent Application No. 201910329041.8 filed in P.R. China on Apr. 23, 2019, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

TECHNICAL FIELD

The invention relates to a photovoltaic inverter system and a method for controlling the same, and particularly relates to a photovoltaic inverter system with inverter and optimizing modules, and a method for controlling the same.

BACKGROUND ART

Currently, the photovoltaic power generation technology has been well developed, and has been widely applied on residential and commercial roof. The photovoltaic power generation system comprises a photovoltaic panel, a junction box, an inverter and other devices. The photovoltaic panel converts the received solar energy into DC electric power, and the inverter converts the DC electric power into desired AC electric power to be supplied to a power grid or to customers for use.

The photovoltaic inverter system having several optimizers enables the photovoltaic panel to have tracking of the maximum output power. On the other hand, the photovoltaic panels connected in series and in parallel may have high voltage and high energy, and when an emergency (earthquake, fire, etc.) occurs, these photovoltaic panels with high voltage and high energy have to be immediately shut down to prevent any further damage caused by these panels with high voltage and high energy. The traditional photovoltaic system requires an extra rapid shut-down device coupled to the photovoltaic panels, while the photovoltaic system having an optimizer can achieve rapid shut-down of the panels using the optimizer. However, the optimizers on the roof need to communicate with an inverter of subsequent power stage to achieve rapid shut-down, for example, by adding a modem circuit, such that the cost is increased and the transmitted data is vulnerable to the interference of energy signals and the like, the communication also create reliability problem or economic loss due to poor communication or interference.

A photovoltaic inverter system that overcomes the above deficiencies, and a method for controlling the same are hereby disclosed in this application.

DISCLOSURE OF THE PRESENT INVENTION

The invention provides a photovoltaic inverter system, comprising: an optimizing module string and an inverter, wherein the optimizing module string comprises a plurality of optimizing modules each having an input port coupled to at least one photovoltaic module, output ports of the plurality of optimizing modules are connected in series, each of the optimizing modules comprises a control unit, an input port of the inverter is coupled to an output port of the optimizing module string, the inverter comprises an auxiliary detection module for detecting an output current of the optimizing module string, and the control unit controls an output voltage of the optimizing module string based on the output current of the optimizing module string, such that the output voltage satisfies a start-up condition of the inverter.

In the photovoltaic inverter system, the control unit further controls the optimizing module string to be rapidly shut down, based on the output current of the optimizing module string.

In the photovoltaic inverter system, the auxiliary detection module is integrated inside the inverter.

In the photovoltaic inverter system, the auxiliary detection module comprises a power resistor.

In the photovoltaic inverter system, the auxiliary detection module comprises a controllable current source.

In the photovoltaic inverter system, the auxiliary detection module is externally connected to the inverter.

In the photovoltaic inverter system, the start-up condition of the inverter is that the inverter has an input voltage in a first voltage range.

The invention further provides a method for controlling any one of the above photovoltaic inverter systems, comprising:

step S1 for controlling each of the optimizing modules to output an initial voltage;

step S2 for detecting and determining an output voltage of the optimizing module string, and connecting the auxiliary detection module to the inverter when the output voltage of the optimizing module string is in a second voltage range;

step S3 for detecting an output current or the output voltage of the optimizing module string, and calculating a number of the optimizing modules actually connected in the optimizing module string;

step S4 for controlling, by a control unit of the optimizing module, a corresponding optimizing module based on the number of optimizing modules actually connected in the optimizing module string, such that the output voltage of the optimizing module string satisfies a start-up condition of the inverter.

The control method further comprises:

step S5 for detecting and determining an output current of the optimizing module string, and controlling, by the control unit of the optimizing module, the corresponding optimizing module to output the initial voltage when the output current is less than a preset minimum current.

In the control method, the start-up condition of the inverter is that the inverter has an input voltage in a first voltage range.

In the control method, the step S3 comprises:

step S31 for detecting, by the control unit of the optimizing module, the output current of the optimizing module string, and calculating the output voltage of the optimizing module string;

step S32 for detecting, by the control unit of the optimizing module, the output voltage of the corresponding optimizing module, and calculating the number of optimizing modules actually connected in the optimizing module string.

In the control method, the step S3 comprises:

step S31 for detecting, by the inverter, the output voltage of the optimizing module string, and calculating the number of optimizing modules actually connected in the optimizing module string;

step S32 for switching the auxiliary detection module on and off to generate and transmit pulses to the optimizing module string, wherein a number of pulses is proportional to the number of optimizing modules actually connected in the optimizing module string.

In the control method, the step S4 comprises:

step S41 for controlling, by the control unit of the optimizing module, the corresponding optimizing module to output a maximum voltage based on the number of optimizing modules, wherein the maximum voltage allows the output voltage of the optimizing module string to satisfy the start-up condition of the inverter;

step S42 for detecting, by the inverter, the output voltage of the optimizing module string, wherein the inverter starts up to connect the photovoltaic inverter system to a power grid when the start-up condition is met.

In the control method, the auxiliary detection module comprises a plurality of power resistors connected in parallel.

In the control method, the step S2 comprises:

step S21 for detecting and determining the output voltage of the optimizing module string, and connecting a first power resistor to the inverter when the output voltage of the optimizing module string is in a second voltage range;

step S22 for detecting and determining the output current of the optimizing module string, and controlling, by the control unit, the corresponding optimizing module to output a preset voltage when the output current of the optimizing module string is in a first current range;

step S23 for detecting and determining the output voltage of the optimizing module string, disconnecting the first power resistor and connecting a second power resistor to the inverter when the output voltage of the optimizing module string is in a third voltage range, and disconnecting the first power resistor and connecting a third power resistor to the inverter when the output voltage of the optimizing module string is in a fourth voltage range.

In the control method, the auxiliary detection module comprises a controllable current source.

In the control method, the step S4 further comprises:

step S43 for controlling, by the control unit of the optimizing module, the corresponding optimizing module to operate in Maximum Power Point Tracking (MPPT) mode.

The control method further comprises:

step S6 for detecting, by the control unit of the optimizing module, the output current of the corresponding optimizing module, and controlling the corresponding optimizing module to operate in a MPPT mode when the output current is larger than a preset threshold current for a preset period of threshold time.

With respect to the prior art, the invention may have the following effects: by sampling the output voltage and the output current of the optimizing module, the optimizing module of the invention, which may have a simple structure, high reliability, ease of controlling and debugging, and complete function, is capable of controlling the operating state of the photovoltaic inverter system without traditional communication with the inverter, appropriately controlling the output voltage of the optimizing module to ensure safely start-up of the inverter, and allowing the optimizing module to operate in a MPPT mode and to have Rapid Shut-Down (RSD) function.

DETAILED DESCRIPTION OF THE EXEMPLARY EMBODIMENTS

Hereinafter, the invention will be described in detail with reference to accompanying drawings and specific embodiments. The embodiments are carried out on the basis of the technical solution of the invention to illustrate detailed implementations and processes, but the protection scope of the invention is not limited to the embodiments.

Figure 1:
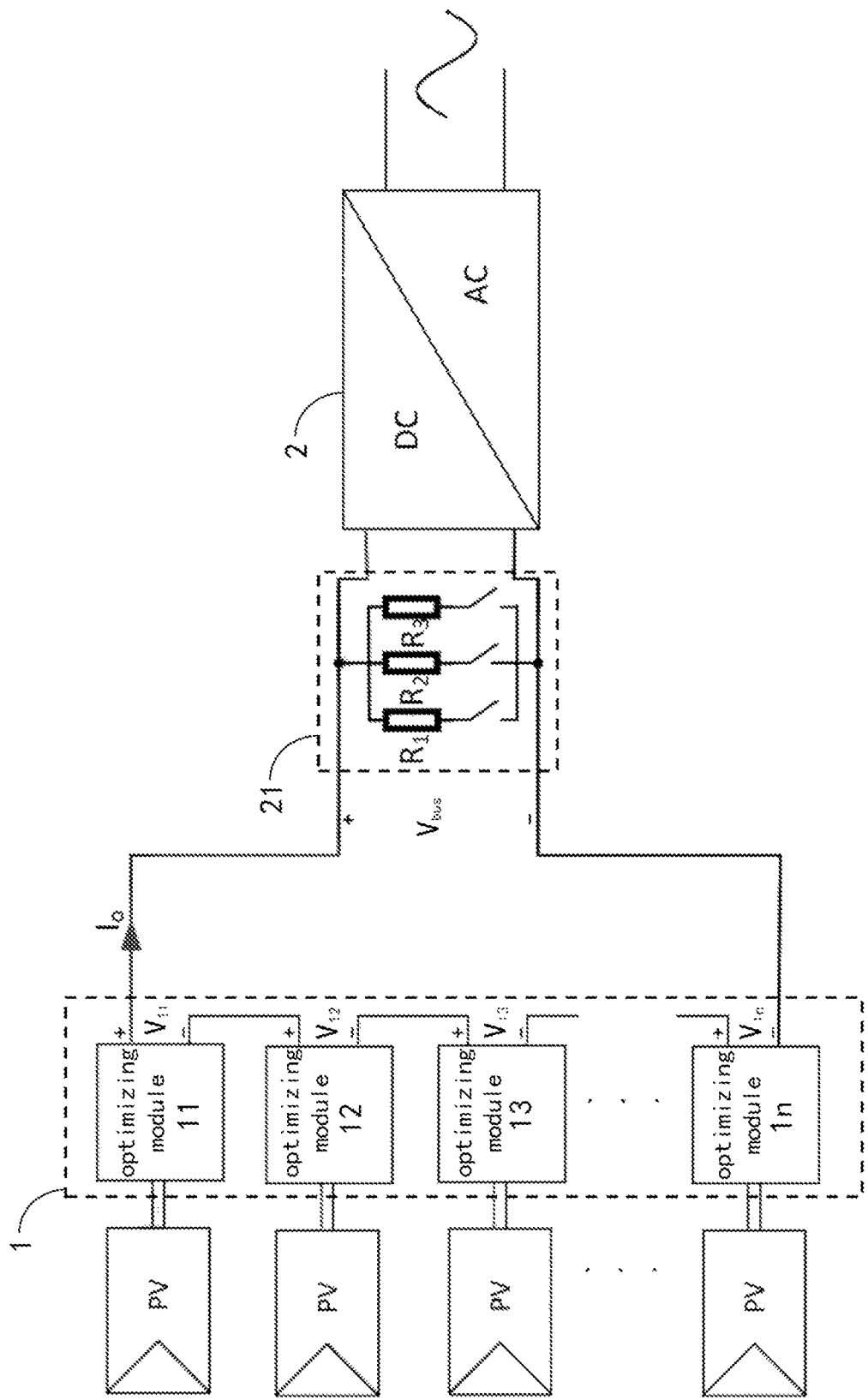
FIG. 1 is a diagram showing a structure of a photovoltaic inverter system according to a first embodiment of the invention.

FIG. 1 is a diagram showing a structure of a photovoltaic inverter system according to a first embodiment of the invention. As shown in FIG. 1, the photovoltaic inverter system of the invention comprises: an optimizing module string 1 and an inverter 2. The optimizing module string 1 comprises a plurality of optimizing modules 11, ..., 1n, each having an input port coupled to at least one photovoltaic module, such as PV panel, wherein n is a positive integer. The output ports of the plurality of optimizing modules 11, ..., 1n are connected in series. Each of the optimizing modules 11, ..., 1n comprises a control unit. An input port of the inverter 2 is coupled to an output port of the optimizing module string 1. The inverter 2 comprises an auxiliary detection module 21 connected in parallel with the input port of the inverter 2 for detecting an output current of the optimizing module string 1. The control unit controls an output voltage of the optimizing module string 1 based on the output current of the optimizing module string 1, such that the output voltage satisfies a start-up condition of the inverter 2. The start-up condition of the inverter 2 is that the inverter 2 has an input voltage Vbus in a first voltage range, i.e., Vmin≤Vbus≤Vmax, wherein Vmin is a minimum voltage that satisfies the start-up condition of the inverter 2, and Vmax is a maximum voltage that satisfies the start-up condition of the inverter 2. However, the invention is not limited thereto.

Further, the control unit further controls the rapid shutdown of the optimizing module string 1 based on the output current of the optimizing module string 1.

Further, in this embodiment, the auxiliary detection module 21 may be integrated into the inverter 2, but the invention is not limited thereto. In another embodiment, the auxiliary detection module 21 is externally connected to the inverter 2.

Further, the auxiliary detection module 21 comprises a first power resistor R1, a second power resistor R2 and a third power resistor R3.

Figure 2:
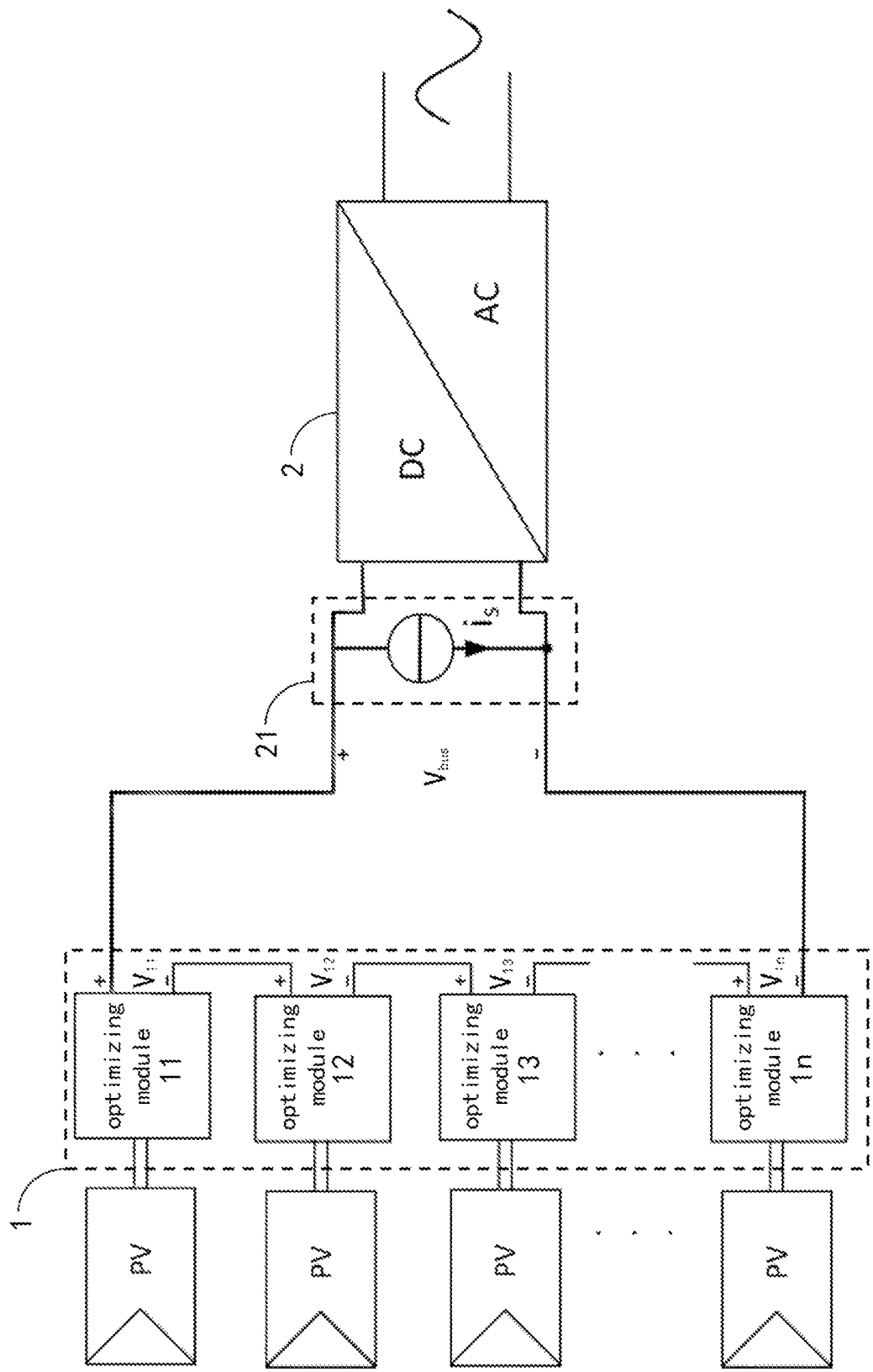
FIG. 2 is a diagram showing a structure of a photovoltaic inverter system according to a second embodiment of the invention.

FIG. 2 is a diagram showing a structure of a photovoltaic inverter system according to a second embodiment of the invention. The photovoltaic inverter system shown in FIG. 2 is substantially the same as the photovoltaic inverter system shown in FIG. 1, so the same parts will not be explained in detail. The difference in the second embodiment is that the auxiliary detection module 21 comprises a controllable current source 211.

Figure 3:
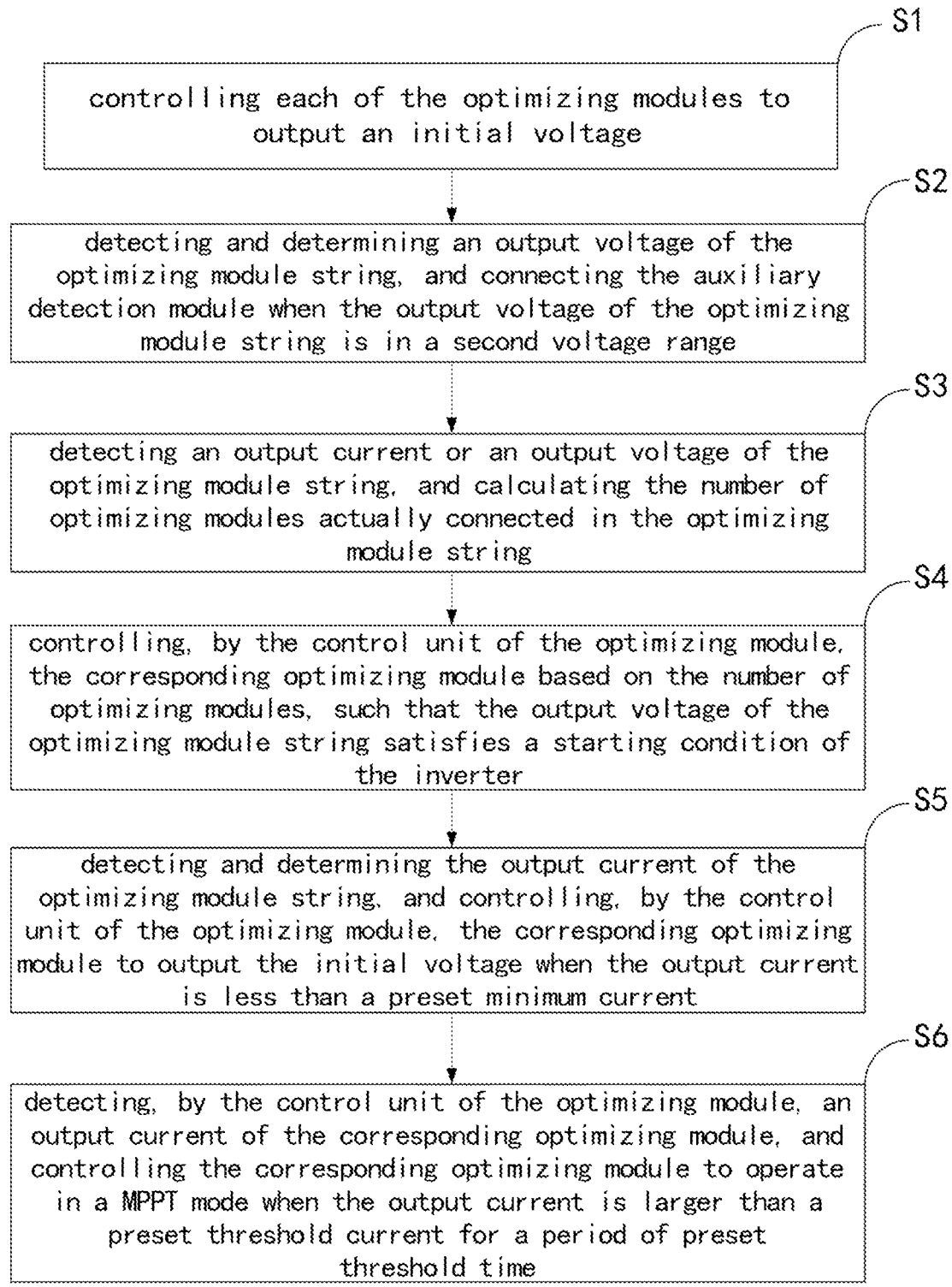
FIG. 3 is a flow diagram showing a control method according to the first embodiment of the invention.
Figure 4:
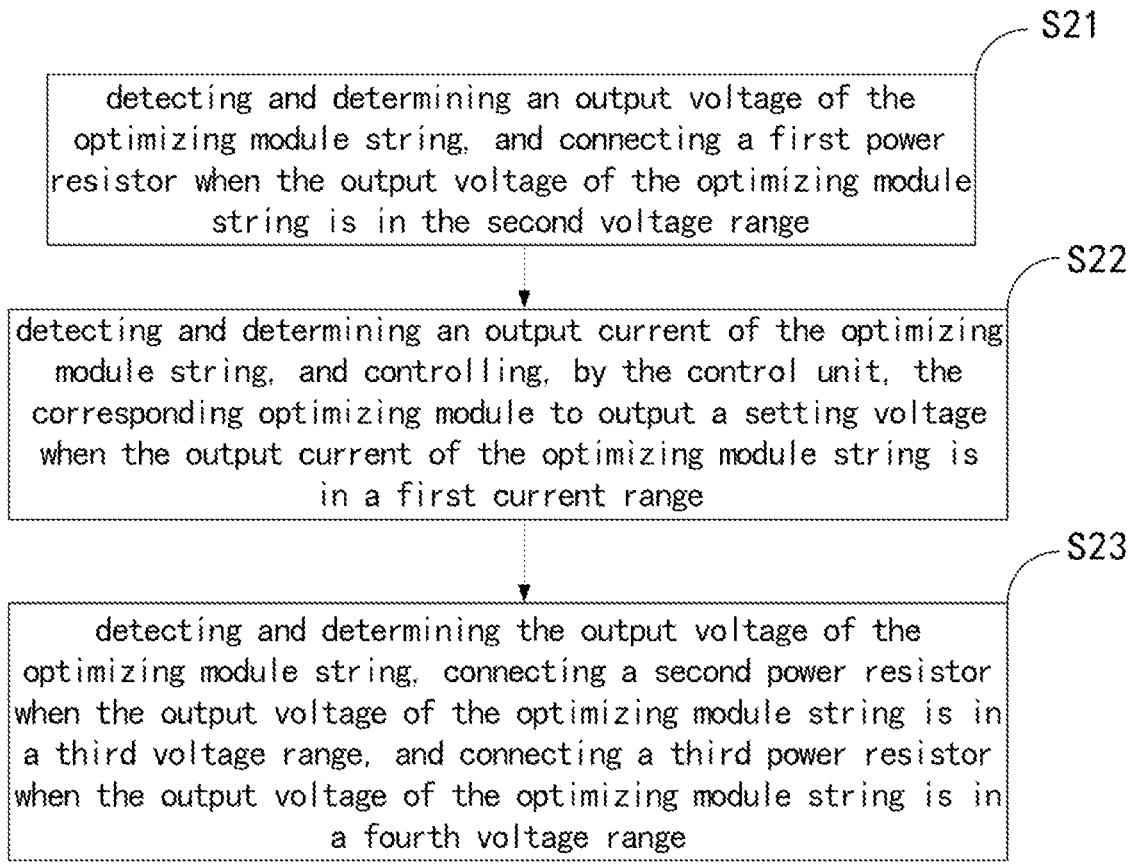
FIGS. 4-6 are flow diagrams showing the details of controlling method in FIG. 3.
Figure 5:
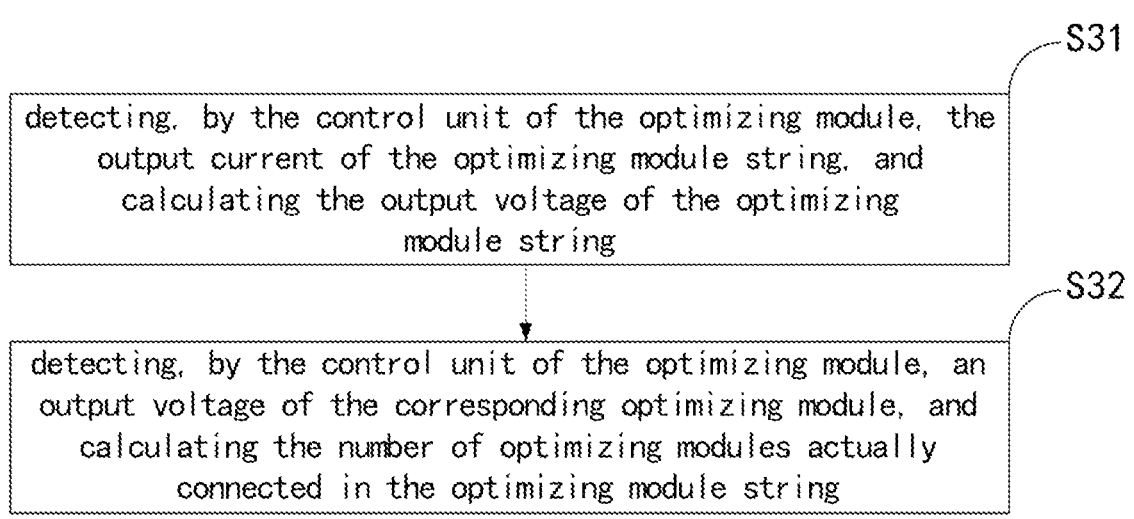
Figure 6:
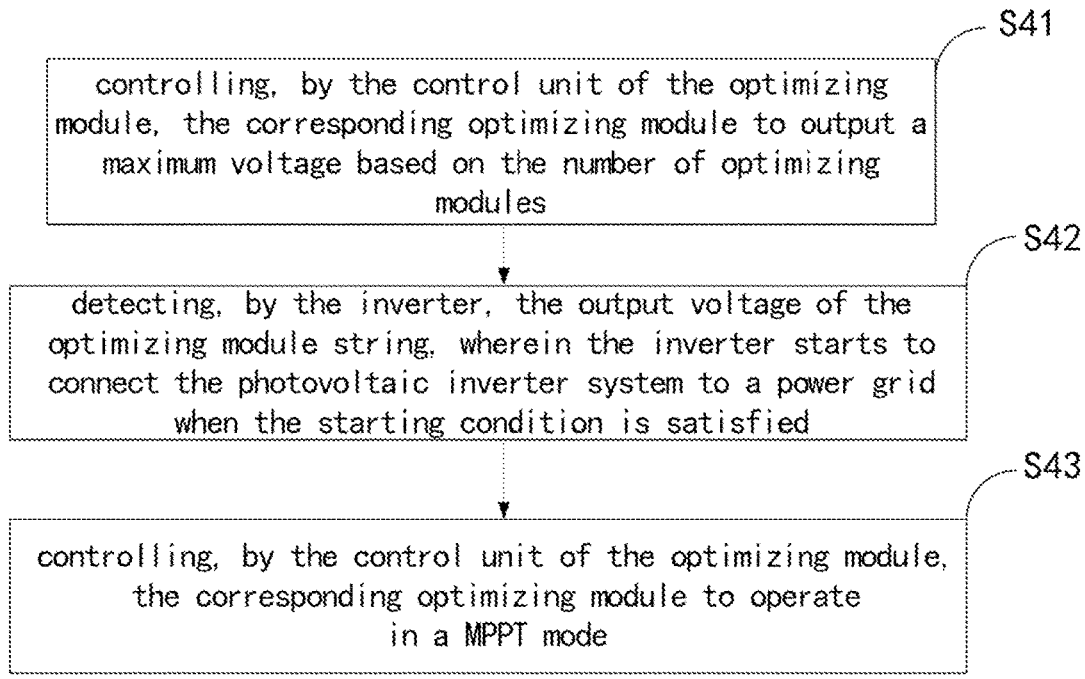

FIG. 3 is a flow diagram showing a control method according to the first embodiment of the invention, and FIGS. 4-6 are flow diagrams showing the details of controlling method in FIG. 3. Hereinafter, the method for controlling the photovoltaic inverter system of the invention will be explained with reference to FIGS. 1 and 3-6. The control method comprises:

step S1 for controlling each of the optimizing modules to output an initial voltage Vostart, wherein 0V≤Vostart≤2V, and the initial voltage Vostart is set to be relatively small, such as 1V according to one embodiment, but the invention is not limited thereto;

step S2 for detecting and determining an output voltage Vbus of the optimizing module string, and connecting the auxiliary detection module to the inverter when the output voltage Vbus of the optimizing module string is in a second voltage range, i.e., Vmin1≤Vbus≤Vmax1;

step S3 for detecting an output current Io or the output voltage Vbus of the optimizing module string, and calculating a number of optimizing modules actually connected in the optimizing module string; it shall be noted that the output current Io of the optimizing module string is detected in step S3 according to one embodiment, but the invention is not limited thereto, and the output voltage Vbus of the optimizing module string can be detected according to another embodiment;

step S4 for controlling, by the control unit of the optimizing module, a corresponding optimizing module based on the number of optimizing modules, such that the output voltage Vbus of the optimizing module string satisfies a start-up condition of the inverter, i.e., Vmin1≤Vbus≤Vmax1.

Further, the step S2 comprises:

step S21 for detecting and determining the output voltage of the optimizing module string, and connecting a first power resistor R1 to the inverter when the output voltage of the optimizing module string is in a second voltage range, i.e., Vmin2≤Vbus≤Vmax2, e.g., 5V≤Vbus≤30V and the first power resistor R1 has a resistance value of 5Ω according to a preferable embodiment, but the invention is not limited thereto;

step S22 for detecting and determining the output current Io of the optimizing module string, and controlling, by the control unit, the corresponding optimizing module to output a preset voltage Vset when the output current Io of the optimizing module string is in a first current range, i.e., Imin1≤Io≤Imax1, wherein 1 A≤Io≤3 A and Vset is 5V according to a preferable embodiment;

step S23 for detecting and determining the output voltage of the optimizing module string, disconnecting the first power resistor R1 and connecting the second power resistor R2 to the inverter when the output voltage of the optimizing module string is in a third voltage range, i.e., Vmin3≤Vbus≤Vmax3, and disconnecting the first power resistor R1 and connecting the third power resistor R3 when the output voltage of the optimizing module string is in a fourth voltage range, i.e., Vmin4≤Vbus≤Vmax4, wherein the third voltage range is 20V≤Vbus≤50V, the fourth voltage range is 60V≤Vbus1≤100V, the second power resistor R2 has a resistance value of 50Ω, and the third power resistor R3 has a resistance value of 110Ω according to a preferable embodiment.

Further, the step S3 comprises:

step S31 for detecting, by the control unit of the optimizing module, the output current Io of the optimizing module string, and calculating the output voltage Vbus of the optimizing module string, Vbus=Io×R2 or Vbus=Io×R3;

step S32: detecting, by the control unit of the optimizing module, an output voltage of the corresponding optimizing module, and calculating the number N of optimizing modules actually connected in the optimizing module string. At this time, the output voltage of each optimizing module can be Vset, as an example, and the number N of the optimizing modules actually connected is calculated by the control unit of each optimizing module based on the formula N=Vbus/Vset.

Further, the step S4 comprises:

step S41 for controlling, by the control unit of the optimizing module, the corresponding optimizing module to output a maximum voltage Vomax based on the number of optimizing modules, wherein the maximum voltage Vomax allows the output voltage of the optimizing module string to satisfy the start-up condition of the inverter;

step S42 for detecting, by the inverter, the output voltage Vbus of the optimizing module string, wherein the inverter starts up to connect the photovoltaic inverter system to a power grid when the start-up condition is met.

In another embodiment of the invention, the step S4 further comprises:

step S43 for controlling, by the control unit of the optimizing module, the corresponding optimizing module to operate in a MPPT mode.

Figure 7:
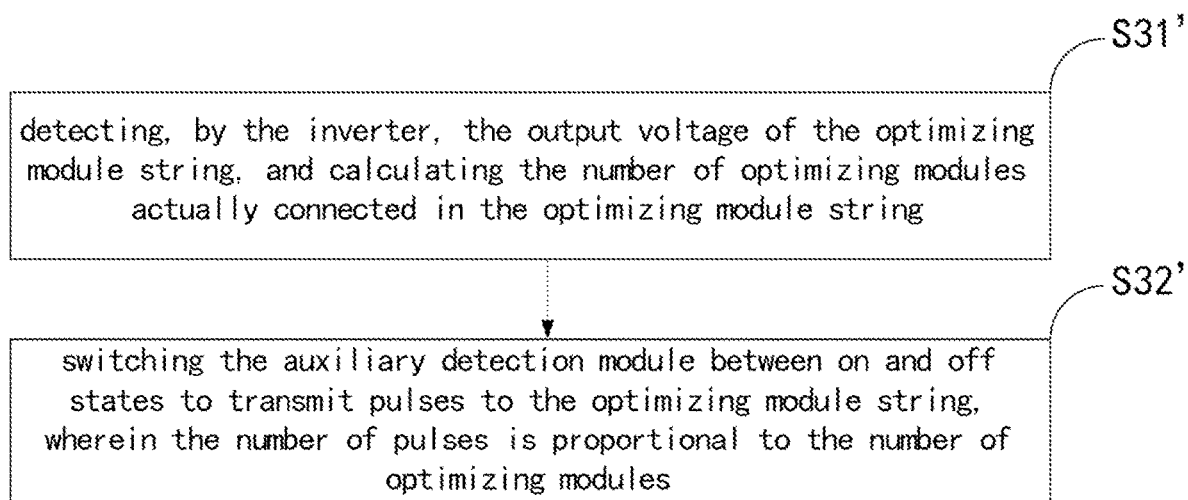
FIG. 7 is a flow diagram showing the step S3 in the control method according to the second embodiment of the invention.

FIG. 7 is a flow diagram showing the step S3 in the control method according to the second embodiment of the invention. The steps of the control method shown in FIG. 7 are substantially the same as the steps of the control method shown in FIGS. 3-6, and the same parts will not be explained in detail.

As shown in FIG. 7, the step S3 comprises:

step S31' for detecting, by the inverter, the output voltage Vbus of the optimizing module string, and calculating the number N of optimizing modules actually connected in the optimizing module string; it shall be noted that the preset voltage Vset of each optimizing module is stored inside the inverter in advance, and the number N of optimizing modules actually connected is calculated by the inverter based on the formula N=Vbus/Vset;

step S32' for switching the auxiliary detection module on and off to transmit pulses to the optimizing module string, wherein the number of pulses is proportional to the number of optimizing modules. In one embodiment, when the optimizing modules are detected to have a number of N, the inverter may transmit pulses having a number of n, wherein n=5N. The optimizing module detects the pulses transmitted from the inverter to have the number of n, and then calculate the number of optimizing modules to be N=n/5, wherein N is a minimum integer no less than n/5. In this embodiment, only when the number of pulses that are lost during transmission of the pulses is greater than or equal to 5, an error will occur, such that an error tolerance may be improved, but the invention is not limited thereto.

It shall be noted that the auxiliary detection module may comprise a plurality of power resistors connected in parallel according to the first and second embodiments, but the invention is not limited thereto. In another embodiment, the auxiliary detection module may comprise a controllable current source.

In another embodiment of the invention, the control method further comprises step S5 for detecting and determining the output current Io of the optimizing module string, and controlling, by the control unit of the optimizing module, the corresponding optimizing module to output the initial voltage Vostart when the output current Io is less than a preset minimum current Imin. Specifically, when the inverter is off the grid, the current which is rapidly decreasing is detected by the optimizing module, and the optimizing module may output the initial voltage Vostart to achieve rapid shut-down once the detected current Io<Imin, wherein Vostart is set to be relatively small (0V≤Vostart≤2V) to ensure that the output voltage of the optimizing modules connected in series can be controlled to have a relatively low voltage level during the rapid shut-down, such that when an emergency (earthquake, fire, etc.) occurs, any huge damage caused by the photovoltaic panels with high voltage and high energy can be prevented, and rescuers who may be near the panels can be protected.

In another embodiment of the invention, the control method further comprises step S6 for detecting, by the control unit of the optimizing module, the output current Io of the corresponding optimizing module, and controlling the corresponding optimizing module to operate in a MPPT mode when the output current Io is larger than a preset threshold current Iset for a period of preset threshold time T. Specifically, during the start-up process, when the optimizing module outputs a current within a certain range, the optimizing module may enter the start-up process until the inverter starts up successfully and operates stably. When the optimizing module outputs a current not satisfying the start-up condition, the optimizing module may not enter the start-up process. Instead, the optimizing module may directly enter the MPPT mode and stably operate after the output current is greater than a threshold current for a period of time, which indicates that the inverter has started successfully and a bus voltage is controlled by the inverter. Therefore, even when several optimizers in the photovoltaic system cannot start-up temporarily when shielded by cloud or the shadow of building, these optimizers may enter the MPPT mode and stably operate after the inverters start-up successfully.

In conclusion, by sampling the output voltage and the output current of the optimizing module, the optimizing module of the invention, which may have a simple structure, high reliability, ease of controlling and debugging, and complete function, is capable of controlling the operating state of the optimizing module without traditional communication with the inverter, appropriately controlling the output voltage of the optimizing module to ensure safe start-up of the inverter, and achieving MPPT function and RSD function.

It shall be noted that the above embodiments are merely provided to explain the invention, rather than limiting the technical solution claimed by the invention. Meanwhile, although the invention is explained in detail with reference to the above embodiments, the person having ordinary skills in the art shall understand that various modifications or equivalent replacements can be made to the invention. Therefore, all technical solution and improvement thereof without departing from the spirit and extent of the invention shall fall into the protection scope of the claims appended in the specification.

The invention claimed is:

1. A photovoltaic inverter system, comprising:
an optimizing module string comprising a plurality of optimizing modules each having an input port coupled to at least one photovoltaic module, output ports of the plurality of optimizing modules are connected in series; and
an inverter having an input port coupled to an output port of the optimizing module string, the inverter comprising a circuit for detecting an output voltage and output current of the optimizing module string; and
an auxiliary detection module for assisting in detecting a number of optimizing modules actually connected in the optimizing module string,
wherein the auxiliary detection module is connected in parallel with the input port of the inverter and connected to the output port of the optimizing module string,
wherein the auxiliary detection module comprises a power resistor or a controllable current source,
wherein each of the optimizing modules comprises a control unit configured to detect an output voltage and output current of a corresponding optimizing module and control the output voltage of the corresponding optimizing module based on the number of optimizing modules actually connected in the optimizing module string, such that the output voltage of the optimizing module string satisfies a start-up condition of the inverter, and
wherein the control unit is configured to calculate the output voltage of the optimizing module string based on the output current of the optimizing module and a resistance value of the auxiliary detection module, and calculate the number of optimizing modules actually connected in the optimizing module string based on the calculated output voltage of the optimizing module string and the output voltage of the optimizing module, or
wherein the inverter is configured to calculate the number of optimizing modules actually connected in the optimizing module string based on the output voltage of the optimizing module string and a preset voltage of the optimizing module, and switch the auxiliary detection module on and off to generate and transmit pulses to the optimizing module string, wherein a number of pulses is proportional to the number of optimizing modules actually connected in the optimizing module string.

2. The photovoltaic inverter system of claim 1, wherein the control unit is further configured to control the optimizing module string to be rapidly shut down, based on the output current of the optimizing module string.

3. The photovoltaic inverter system of claim 1, wherein the start-up condition of the inverter is that the inverter has an input voltage in a first voltage range.

4. A method for controlling the photovoltaic inverter system of claim 1, comprising:
step S1 for controlling each of the optimizing modules to output an initial voltage;
step S2 for detecting and determining the output voltage of the optimizing module string, and connecting the auxiliary detection module to the inverter when the output voltage of the optimizing module string is in a second voltage range;
step S3 for calculating a number of optimizing modules actually connected in the optimizing module string; and
step S4 for controlling, by the control unit of the optimizing module, a corresponding optimizing module based on the number of optimizing modules actually connected in the optimizing module string, such that the output voltage of the optimizing module string satisfies the start-up condition of the inverter, wherein the auxiliary detection module comprises a plurality of power resistors connected in parallel or a controllable current source, and wherein the step S3 comprises:

step S31 for detecting, by the control unit of the optimizing module, the output current of the corresponding optimizing module, and calculating the output voltage of the optimizing module string based on the output current of the optimizing module and a resistance value of the auxiliary detection module; and step S32 for detecting, by the control unit of the optimizing module, an output voltage of the corresponding optimizing module, and calculating the number of optimizing modules actually connected in the optimizing module string based on the calculated output voltage of the optimizing module string and the output voltage of the corresponding optimizing module, or wherein the step S3 comprises:

step S31' for detecting, by the inverter, the output voltage of the optimizing module string, and calculating the number of optimizing modules actually connected in the optimizing module string based on the output voltage of the optimizing module string and a present voltage of the optimizing module; and step S32' for switching the auxiliary detection module on and off to generate and transmit pulses to the optimizing module string, wherein a number of pulses is proportional to the number of optimizing modules actually connected in the optimizing module string.

5. The method of claim 4, further comprising:

step S5 for detecting and determining the output current of the optimizing module string, and controlling, by the control unit of the optimizing module, the corresponding optimizing module to output the initial voltage when the output current is less than a preset minimum current.

6. The method of claim 4, wherein the start-up condition of the inverter is that the inverter has an input voltage in a first voltage range.

7. The method of claim 4, wherein the step S4 comprises:

step S41 for controlling, by the control unit of the optimizing module, the corresponding optimizing module to output a maximum voltage based on the number of optimizing modules, wherein the maximum voltage allows the output voltage of the optimizing module string to satisfy the start-up condition of the inverter; and step S42 for detecting, by the inverter, the output voltage of the optimizing module string, wherein the inverter starts up to connect the photovoltaic inverter system to a power grid when the start-up condition is met.

8. The method of claim 4, wherein the step S2 comprises:

step S21 for detecting and determining the output voltage of the optimizing module string, and connecting a first power resistor to the inverter when the output voltage of the optimizing module string is in the second voltage range;

step S22 for detecting and determining the output current of the optimizing module string, and controlling, by the control unit, the corresponding optimizing module to output a preset voltage when the output current of the optimizing module string is in a first current range; and step S23 for detecting and determining the output voltage of the optimizing module string, disconnecting the first power resistor and connecting a second power resistor to the inverter when the output voltage of the optimizing module string is in a third voltage range, and disconnecting the first power resistor and connecting a third power resistor when the output voltage of the optimizing module string is in a fourth voltage range.

9. The method of claim 7, wherein the step S4 further comprises:

step S43 for controlling, by the control unit of the optimizing module, the corresponding optimizing module to operate in Maximum Power Point Tracking (MPPT) mode.

10. The method of claim 4, further comprising:

step S6 for detecting, by the control unit of the optimizing module, an output current of the corresponding optimizing module, and controlling the corresponding optimizing module to operate in a MPPT mode when the output current is larger than a preset threshold current for a preset period of threshold time.

* * * * *